United States Patent
Zhao et al.

(10) Patent No.: US 10,366,342 B2
(45) Date of Patent: Jul. 30, 2019

(54) GENERATION OF A BOOSTED ENSEMBLE OF SEGMENTED SCORECARD MODELS

(71) Applicant: FAIR ISAAC CORPORATION, San Jose, CA (US)

(72) Inventors: Xing Zhao, San Diego, CA (US); Peter Hamilton, Novato, CA (US); Andrew K. Story, Petaluma, CA (US)

(73) Assignee: FAIR ISAAC CORPORATION, San Jose, CA (US)

( * ) Notice: Subject to any disclaimer, the term of this patent is extended or adjusted under 35 U.S.C. 154(b) by 587 days.

(21) Appl. No.: 14/203,195

(22) Filed: Mar. 10, 2014

(65) Prior Publication Data

US 2015/0254568 A1   Sep. 10, 2015

(51) Int. Cl.
*G06N 5/02*   (2006.01)
*G06N 20/00*   (2019.01)

(52) U.S. Cl.
CPC ............. *G06N 20/00* (2019.01); *G06N 5/025* (2013.01)

(58) Field of Classification Search
None
See application file for complete search history.

(56) References Cited

U.S. PATENT DOCUMENTS

2010/0287167 A1* 11/2010 Ralph ................ G06Q 10/10
                                                            707/748

OTHER PUBLICATIONS

Finlay. Multiple classifier architectures and their application to credit risk assessment. European Journal of Operational Research 210 (2011) 368-378.*
Friedman et al. Predictive Learning via Rule Ensembles. The Annals of Applied Statistics. 2008, vol. 2, No. 3, 916-954.*
Bijak et al. Does segmentation always improve model performance in credit scoring? Expert Systems with Applications 39 (2012) 2433-2442.*
U.S. Appl. No. 14/176,971, filed Feb. 10, 2014, Fahner.
Friedman. "Greedy Function Approximation: A Gradient Boosting Machine." *The Annals of Statistics.* vol. 29 No. 5 (2001):1189-1232.

* cited by examiner

*Primary Examiner* — Alexey Shmatov
*Assistant Examiner* — Robert Bejcek, II
(74) *Attorney, Agent, or Firm* — Mintz Levin Cohn Ferris Glovsky and Popeo, P.C.

(57) ABSTRACT

Data is received that include values that correspond to a plurality of variables. A score is then generated based on the received data and using a boosted ensemble of segmented scorecard models. The boosted ensemble of segmented scorecard models includes two or more segmented scorecard models. Subsequently, data including the score can be provided (e.g., displayed, transmitted, loaded, stored, etc.). Related apparatus, systems, techniques and articles are also described.

5 Claims, 4 Drawing Sheets

GENERATION OF A BOOSTED ENSEMBLE OF SEGMENTED SCORECARD MODELS

TECHNICAL FIELD

The subject matter described herein relates to generating a boosted ensemble of segmented scorecard models.

BACKGROUND

A common prediction task is to estimate a function $f$ from predictors to target domain (sometimes referred to as a score). This estimation can be determined, for example, using a linear regression model which is a linear combination of predictors:

$$f = w_0 + \sum_{i=1}^{I} w_i x_i,$$

where $x_i$ is the value of the ith predictor, and $w_i$ the regression weight to be trained.

Compared with regression models, scorecard models include a binning step to divide each predictor space into bins, and then assign score weight to each bin.

$$f = w_0 + \sum_{i=1}^{I} f_i(x_i),$$

where $f_i(x_i)$ is the predictor score:

$$f_i(x_i) = \sum_{j=1}^{J_i} w_{ij} b_{ij}(x_i)$$

$w_{ij}$: the score weights associated with bin j for predictor $x_i$.
$b_{ij}$: the dummy indicator variables for the bins of predictor $x_i$.

$$b_{ij}(x_i) = \begin{cases} 1 & \text{if value of } x_i \text{ belongs to the jth bin} \\ 0 & \text{else} \end{cases}$$

Bins for all predictors can be generated using various binning algorithms, which also support categorical predictors. Missing values can be handled using a missing value bin. Given enough bins for a predictor $x_i$, the above predictor score function $f_i(x_i)$ is flexible to approximate any general function based on a single predictor, and the scorecard model is the sum of such functions. The complete, compact representation of a model by its bin definitions and weights makes the scorecard a popular, transparent, and easily understood model formulation. And the ability of a scorecard to approximate general functions makes it a strong predictive tool.

A scorecard model can be trained to optimize the bin weights such that the prediction error for the model is minimized. Scorecards can be used to predict both continuous and binary targets. Scorecards are generally characterized as being much more powerful than regression models, and still simple enough to be interpretable. By looking into the bin weights for the predictors, insight can be gained for the data.

SUMMARY

In one aspect, data is received that include values that correspond to a plurality of variables. A score is then generated based on the received data and using a boosted ensemble of segmented scorecard models. The boosted ensemble of segmented scorecard models includes two or more segmented scorecard models. Subsequently, data including the score can be provided (e.g., displayed, transmitted, loaded, stored, etc.).

The score $f$ can be calculated by the boosted ensemble of segmented scorecard models based on:

$$f = \beta * s + w_0 + \sum_{i=1}^{I} f_i(x_i),$$

wherein s is a score derived from a previous ensemble, $\beta$ is a shrinking parameter; and wherein the enhanced scorecard model optimizes $\beta$ and predictor bin weights so that the score $f$ is better than the score s.

In an interrelated aspect, the boosted ensemble of segmented scorecard models is generated by: training a first segmented scorecard model, identifying or generating a second segmented scorecard model that provides an enhanced score relative to the first segmented scorecard model, enumerating split variables and split values in the second segmented scorecard model using a segmentation search algorithm, and forming the boosted ensemble scorecard model based on both the first segmented scorecard model and the second segmented scorecard model.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, intuitively, a single segmented scorecard is limited by its segmentation. One tree can only capture limited split variables and split values. When there are many interactions among different variable combinations, it is difficult for one single tree to capture all such interactions. With the ensemble of segmented scorecards as provided herein, there are multiple trees. Such ensembles are more flexible and more powerful to capture the interactions among different variables thereby providing enhanced scores.

The details of one or more variations of the subject matter described herein are set forth in the accompanying drawings and the description below. Other features and advantages of the subject matter described herein will be apparent from the description and drawings, and from the claims.

DETAILED DESCRIPTION

Conventional scorecard models (sometimes referred to herein simply as "scorecards") are additive models which assume there is no interaction among predictors. In practice however, there can be interactions among predictors. There are several techniques to deal with such interactions.

Figure 1:
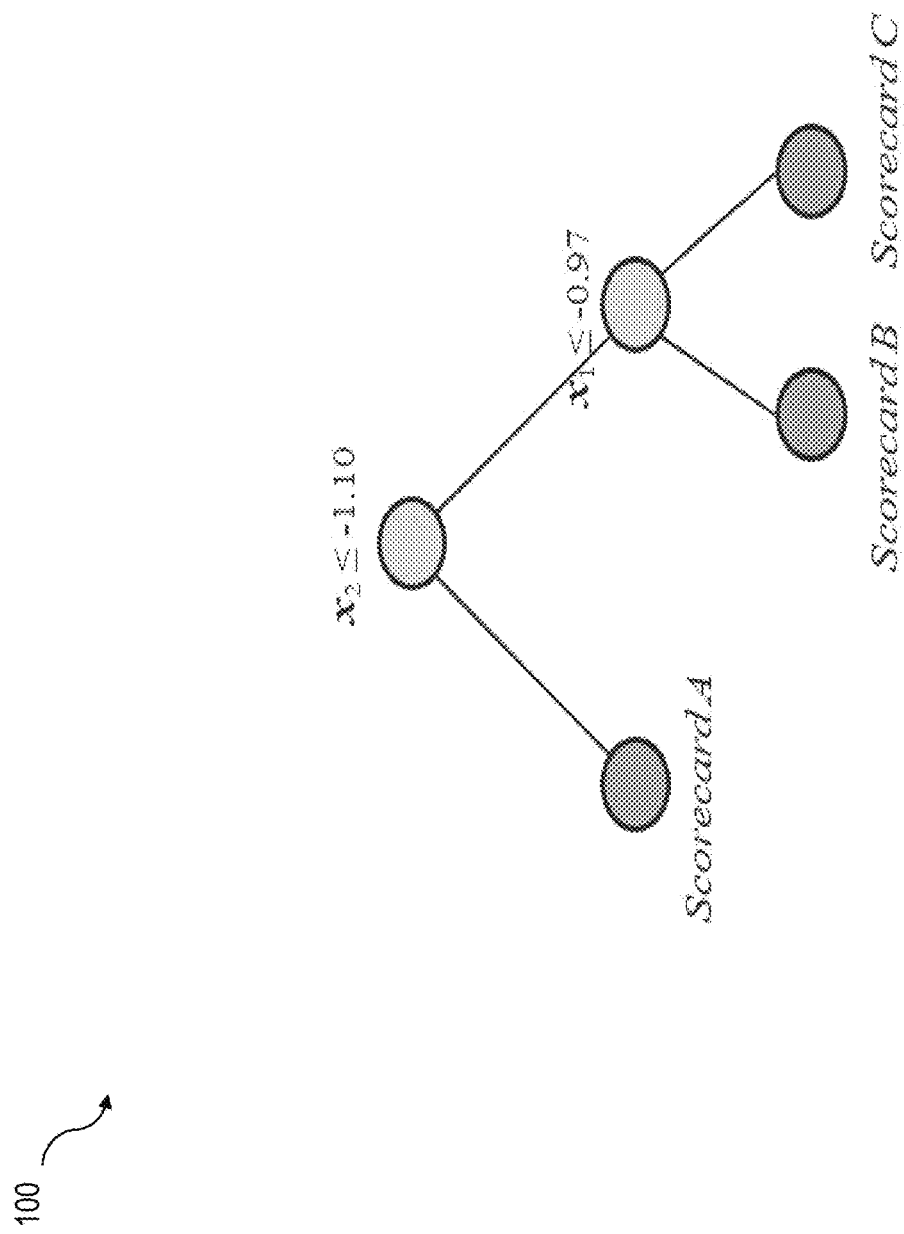
FIG. 1 is a diagram illustrating a segmented scorecard model.

One approach is to use segmented scorecard models such as those described in U.S. patent application Ser. No. 14/176,971, the contents of which are hereby incorporated by reference. When using a traditional decision tree as a predictive model, the leaf node typically returns the dominant outcome (classification) or mean value (regression). With segmented scorecard, one or more leaf nodes are each associated with a scorecard model. By placing individual scorecards in the leaf nodes of a decision tree, the whole segmented scorecard model can capitalize on interactions among the predictors. FIG. 1 is a diagram 100 illustrating an example of a segmented scorecard model in which leaf nodes include scorecards A, B, C. Finding a good segmentation is critical for segmented scorecard. In some variations, a segmentation/tree search algorithm can be used which enumerates various split variables and split values to select the best segmentation/tree.

In machine learning, ensemble methods use multiple models to obtain better predictive performance than could be obtained from any of the single model. Bagging and boosting are two commonly used ensemble methods. Bagging involves having each model in the ensemble vote with equal weight. In order to promote model variance, bagging trains each model in the ensemble using a randomly drawn subset of the training set. As an example, the random forest algorithm combines random decision trees with bagging to achieve better classification accuracy. Boosting involves incrementally building an ensemble by training each new model instance to further improve the performance. The Gradient Boosting Decision Tree algorithm is a successful example of boosting. It builds hundreds of simple decision trees, with each decision tree trying to improve the performance.

Figure 2:
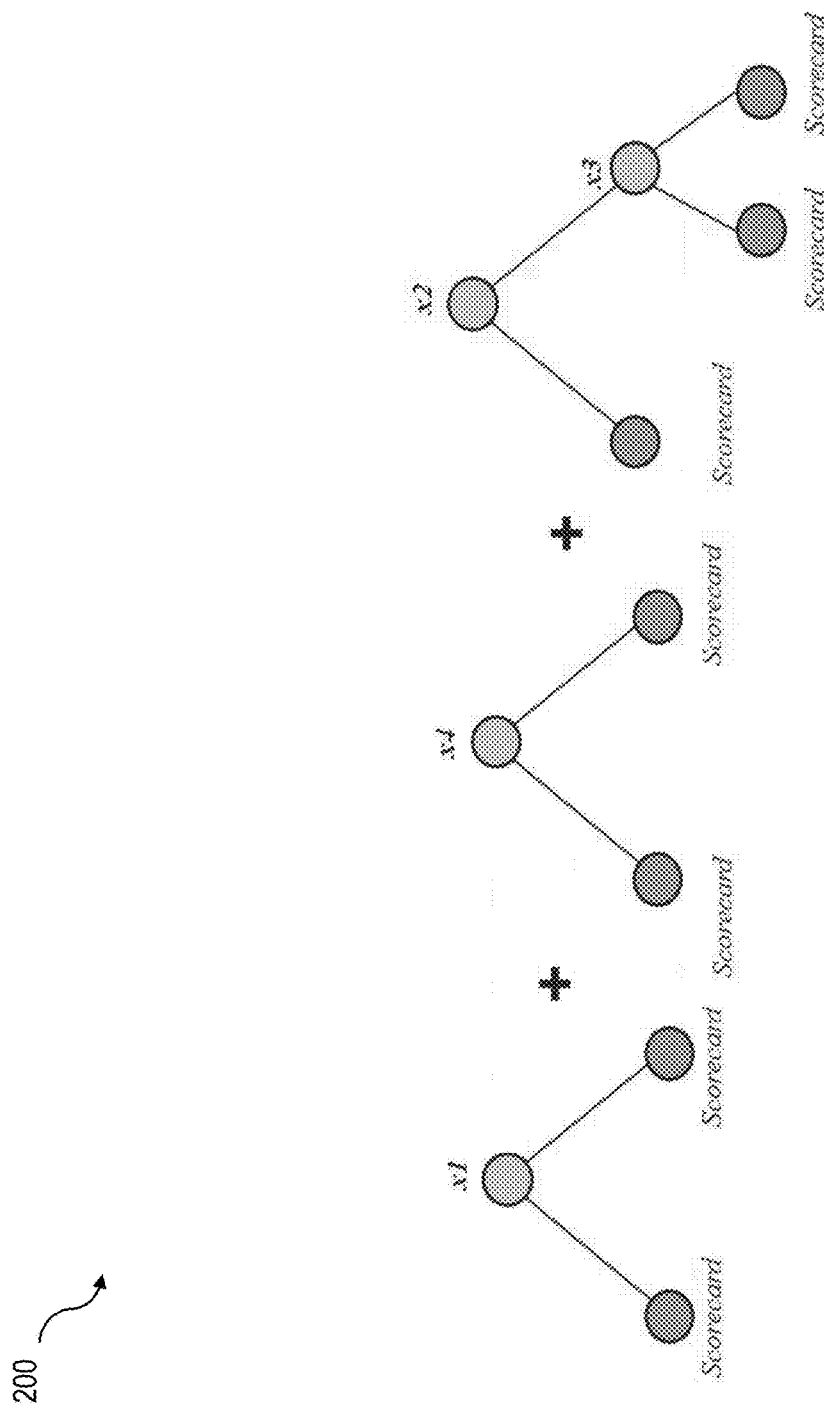
FIG. 2 is a boosted ensemble of scorecard models.

The current subject matter provides for boosting ensemble of segmented scorecards models. In particular, the current subject matter is directed to ensemble multiple segmented scorecards together, with each additional segmented scorecard to further improve the performance. An example boosting ensemble is illustrated in diagram 200 of FIG. 2.

For boosting to work, each additional segmentation scorecard must make improvement to the current score. The scorecard has been enhanced so that it has the ability to consider a given score and make further improvement.

Here is the traditional scorecard formula:

$$f = w_0 + \sum_{i=1}^{I} f_i(x_i),$$

The enhanced scorecard considers an initial score s and makes further improvement:

$$f = \beta * s + w_0 + \sum_{i=1}^{I} f_i(x_i),$$

Here s is the given score or the current score of the ensemble. $\beta$ is a shrinking parameter. The enhanced scorecard will optimize $\beta$ and other predictor bin weights so that the new score $f$ is better than the given score s. If there is no room for improvement, $\beta$ will equal 1 and other bin weights equal 0, so that score $f$ is the same as the given score s.

Figure 3:
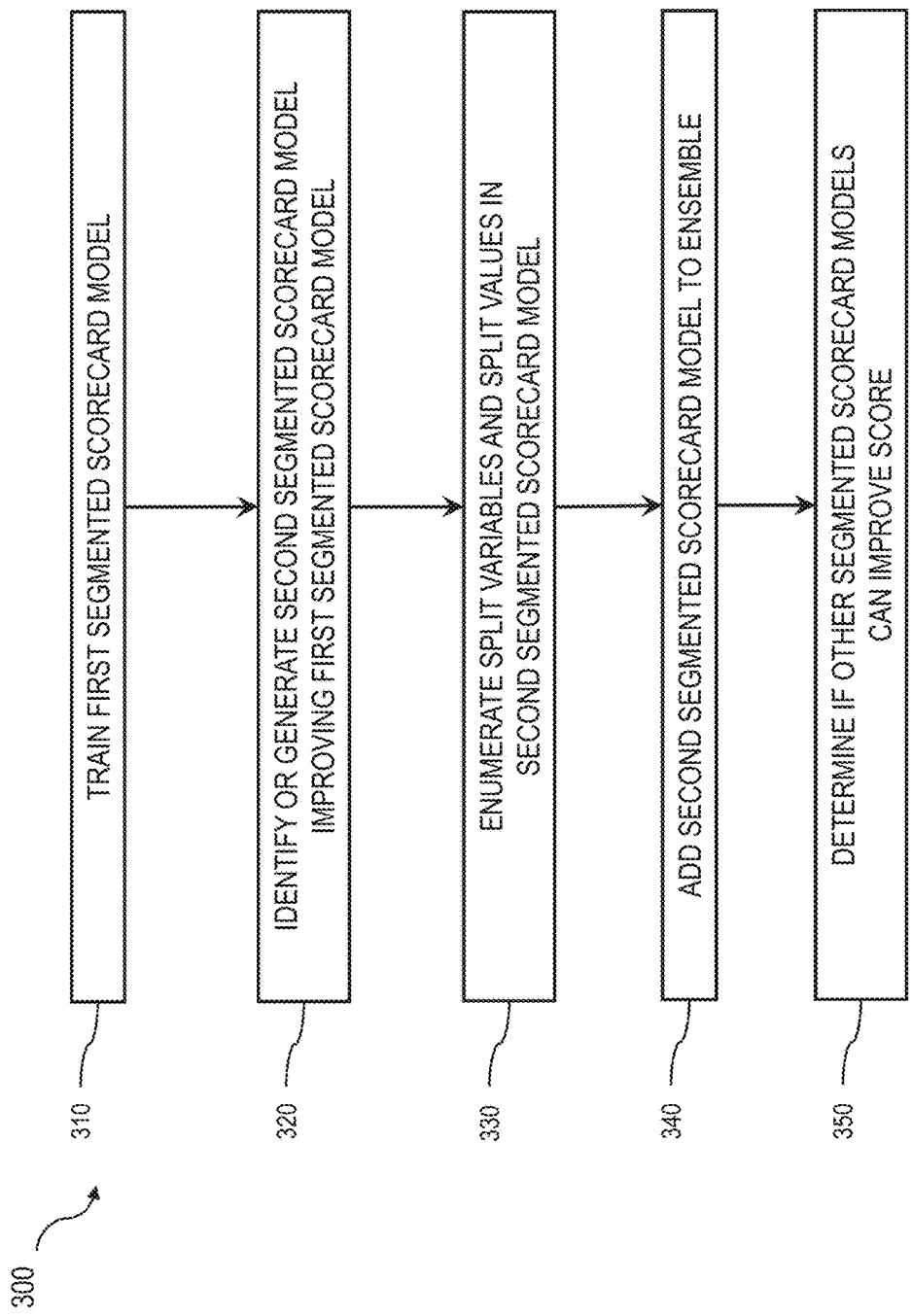
FIG. 3 is a process flow diagram illustrating generating of a boosted ensemble of scorecard models.

FIG. 3 is a process flow diagram 300 for generated boosted ensembles of segmented scorecards. Initially, at 310, a first segmented scorecard model is trained using conventional techniques. At this point, there is one segmented scorecard model in the ensemble and the score of this model. Thereafter, at 320, a second segmented scorecard model is identified or generated to improve the score of the first segmented scorecard model. Next, at 330, a segmentation search algorithm is used to enumerate different split variables and split values in the second segmented scorecard model. In the leaf nodes, instead of a traditional scorecard, an enhanced scorecard can be used to try to improve the current score in the leaf node. The search will pick the best segmentation which lead to the best improvement. Subsequently, at 340, this second segmented scorecard model is added into the ensemble (or to form an ensemble). The output score of the second segmented scorecard model is a better score because it is a combination of the old score and new improvements from the second segmentation. Given this second score, at 350, a further search can be initiated in attempt to identify another segmentation which can improve the second score. This process can keep continue until no new segmentation with further improvement can be identified.

Figure 4:
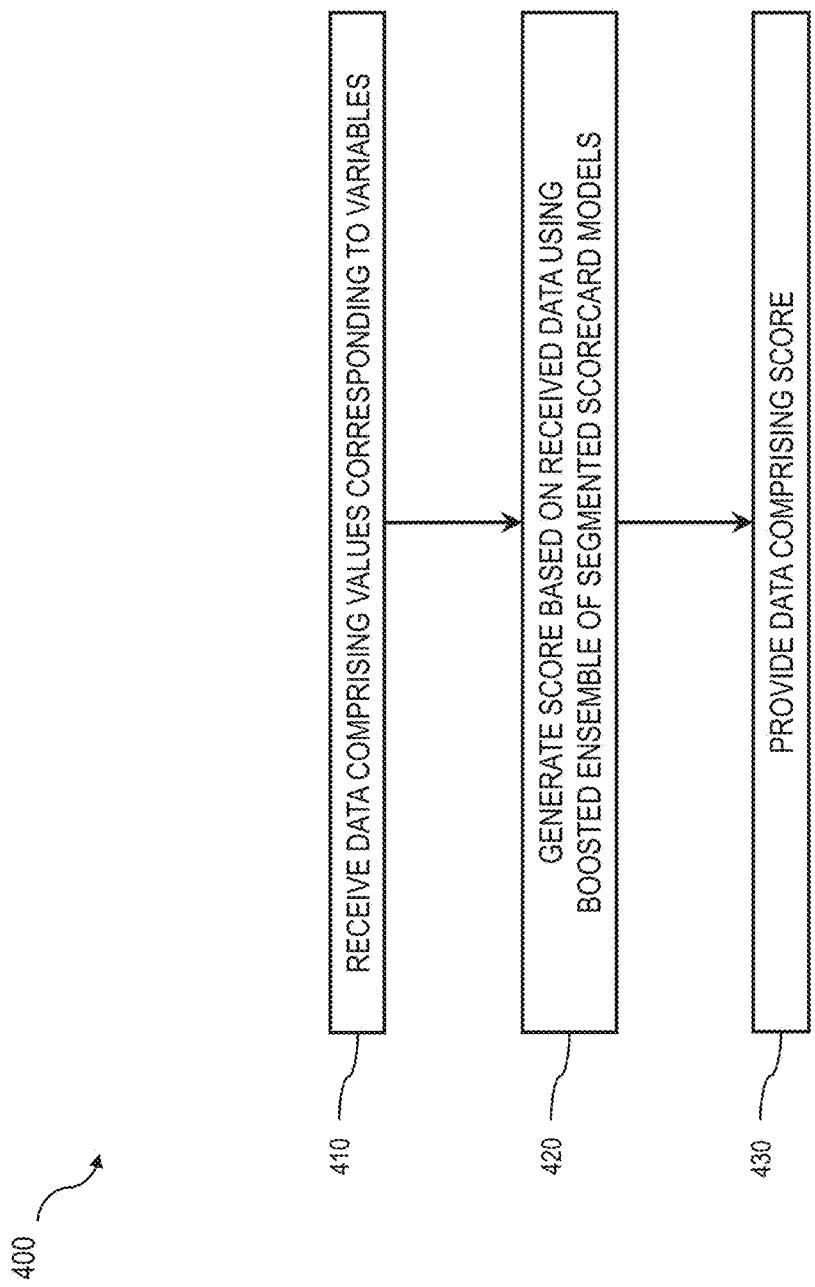
FIG. 4 is a process flow diagram illustrating generation of a score using a boosted ensemble of scorecard models.

FIG. 4 is a diagram 400 illustrating a method in which, at 410, data is received that comprises values for a plurality of variables. Thereafter, at 420, a score is generated based on the received data and using a boosted ensemble of a segmented scorecard models. The boosted ensemble of segmented scorecard model includes two or more segmented scorecard models. Subsequently, at 430, data can be provided (e.g., displayed, loaded, transmitted, stored, etc.) that includes a score.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
   receiving data comprising values corresponding to a plurality of variables;
   generating a prediction score based on the received data and using a boosted ensemble of segmented scorecard models, the boosted ensemble of segmented scorecard models comprising two or more segmented scorecard models, each segmented scorecard model including two or more scorecard models, respective split variables, and respective split values; and
   providing data comprising the prediction score;
   wherein the boosted ensemble of segmented scorecard models is generated by:
   training a first segmented scorecard model;
   identifying or generating a second segmented scorecard model that provides an enhanced score relative to the first segmented scorecard model;
   enumerating the respective split variables and the respective split values in the second segmented scorecard model using a segmentation search algorithm;
   forming the boosted ensemble of segmented scorecard models based on both the first segmented scorecard model and the second segmented scorecard model; and
   iteratively identifying or generating additional segmented scorecard models that provide an enhanced score and adding them to the boosted ensemble of scorecard models until a score of a current boosted ensemble of scorecard models is the same as a score derived from a previous ensemble of scorecard models,
   wherein the score $f$ is calculated by the boosted ensemble of segmented scorecard models based on:

$$f = \beta * s + w_0 + \sum_{i=1}^{I} f_i(x_i),$$

wherein s is the score derived from a previous ensemble, $\beta$ is a shrinking parameter, $f_i(x_i)$ is a predictor score, $w_0$ is a score weight, and I is a number of predictors; and
   wherein the enhanced scorecard model optimizes $\beta$ and predictor bin weights so that the score $f$ is higher than the score s;
   wherein the iteratively identifying or generating of additional segmented scorecard models that provides an enhanced score relative to the enhanced segmented scorecard model and adding them to the boosted ensemble of scorecard models is performed until the shrinking parameter $\beta$ is equal to 1 and other bin weights equal 0 so that score $f$ is the same as the given score s;
   wherein the providing data comprises at least one of: displaying the score, transmitting data comprising the score to a remote computing system, loading data comprising the score into memory, or storing data comprising the score; and
   wherein at least one of the receiving, generating, and providing is implemented by at least one data processor forming part of at least one computing system.

2. A non-transitory computer program product storing instructions which, when executed by at least one data processor forming part of at least one computing system, results in operations comprising:

receiving data comprising values corresponding to a plurality of variables;
generating a prediction score based on the received data and using a boosted ensemble of segmented scorecard models, the boosted ensemble of segmented scorecard models comprising two or more segmented scorecard models, each segmented scorecard model including two or more scorecard models, respective split variables, and respective split values; and
providing data comprising the prediction score;
wherein the boosted ensemble of segmented scorecard models is generated by:
training a first segmented scorecard model;
identifying or generating a second segmented scorecard model that provides an enhanced score relative to the first segmented scorecard model;
enumerating the respective split variables and the respective split values in the second segmented scorecard model using a segmentation search algorithm;
forming the boosted ensemble of segmented scorecard models based on both the first segmented scorecard model and the second segmented scorecard model; and
iteratively identifying or generating additional segmented scorecard models that provide an enhanced score and adding them to the boosted ensemble of scorecard models until a score of a current boosted ensemble of scorecard models is the same as a score derived from a previous ensemble of scorecard models;
wherein the score $f$ is calculated by the boosted ensemble of segmented scorecard models based on:

$$f = \beta * s + w_0 + \sum_{i=1}^{I} f_i(x_i),$$

wherein s is the score derived from a previous ensemble, $\beta$ is a shrinking parameter, $f_i(x_i)$ is a predictor score, $w_0$ is a score weight, and I is a number of predictors; and wherein the enhanced scorecard model optimizes $\beta$ and predictor bin weights so that the score $f$ is higher than the score s,
wherein the iteratively identifying or generating of additional segmented scorecard models that provides an enhanced score relative to the enhanced segmented scorecard model and adding them to the boosted ensemble of scorecard models is performed until the shrinking parameter $\beta$ is equal to 1 and other bin weights equal 0 so that score $f$ is the same as the given score s, and
wherein the providing data comprises at least one of: displaying the score, transmitting data comprising the score to a remote computing system, loading data comprising the score into memory, or storing data comprising the score.

3. A method comprising:
training a first segmented scorecard model including two or more first models, first split variables, and first split values;
identifying or generating a second segmented scorecard model that provides an enhanced score relative to the first segmented scorecard model;
enumerating split variables and split values in the second segmented scorecard model using a segmentation search algorithm so that the second segmented scorecard model includes two or more second models, second split variables, and second split values;
forming a boosted ensemble of scorecard models based on both the first segmented scorecard model and the second segmented scorecard model; and
iteratively identifying or generating additional segmented scorecard models that provides an enhanced score and adding them to the boosted ensemble of scorecard models until a score of a current boosted ensemble of scorecard models is the same as a score derived from a previous ensemble of scorecard models;
wherein a score $f$ is calculated by the boosted ensemble of segmented scorecard models based on:

$$f = \beta * s + w_0 + \sum_{i=1}^{I} f_i(x_i),$$

wherein s is a score derived from a previous ensemble, $\beta$ is a shrinking parameter, $f_i(x_i)$ is a predictor score, $w_0$ is a score weight, and I is a number of predictors; wherein the enhanced scorecard model optimizes $\beta$ and predictor bin weights so that the score $f$ is higher than the score s; wherein the iteratively identifying or generating of additional segmented scorecard models that provides an enhanced score relative to the enhanced segmented scorecard model and adding them to the boosted ensemble of scorecard models is performed until the shrinking parameter $\beta$ is equal to 1 and other bin weights equal 0 so that score $f$ is the same as the given score s; and wherein at least one of the training, identifying, enumerating, and forming is implemented by at least one data processor forming part of at least one computing system.

4. A method as in claim 3, wherein the first segmented scorecard is trained using at least one of a scorecard model, a regression, or a neural network.

5. A method as in claim 3, further comprising:
enabling local or remote access to the boosted ensemble of segmented scorecard models to enable scores to be generated.

* * * * *